United States Patent [19]

Malsot et al.

[11] 4,296,997
[45] Oct. 27, 1981

[54] DEVICE FOR CENTERING AN OPTICAL FIBER WITHIN A TERMINAL, AND A TERMINAL CONSTRUCTED BY MEANS OF SAID DEVICE

[75] Inventors: Christian Malsot; Jean Bouygues, both of Suresnes, France

[73] Assignee: Socapex, Suresnes, France

[21] Appl. No.: 88,458

[22] Filed: Oct. 25, 1979

[30] Foreign Application Priority Data

Oct. 31, 1978 [FR] France ............................... 78 30849

[51] Int. Cl.³ ............................................. G02B 7/26
[52] U.S. Cl. ................................. 350/96.20; 350/96.21
[58] Field of Search ............... 350/96.20, 96.21, 96.22

[56] References Cited

U.S. PATENT DOCUMENTS

| | | | |
|---|---|---|---|
| 3,928,102 | 12/1975 | Rowe et al. | 350/96.21 X |
| 3,938,895 | 2/1976 | Bridger et al. | 350/96.20 X |
| 3,999,841 | 12/1976 | Dakss et al. | 350/96.20 X |
| 4,113,346 | 9/1978 | Jackson et al. | 350/96.20 |
| 4,160,580 | 7/1979 | Le Noane et al. | 350/96.21 |
| 4,193,664 | 3/1980 | Ellwood | 350/96.21 |

FOREIGN PATENT DOCUMENTS 2390745  12/1978  France ............................ 350/96.21

OTHER PUBLICATIONS

Comerford, "Four-Pin Optical Fiber Connector", *IBM Tech. Discl. Bull.*, vol. 21, No. 11, Apr. 1979, pp. 4688–4689.

Primary Examiner—John D. Lee
Attorney, Agent, or Firm—Cushman, Darby & Cushman

[57] ABSTRACT

In order to make a connection between the fibers of an optical transmission line, the end portion of each fiber is centered in a connector terminal by means of a reference dihedron. The terminal is applied against the faces of the dihedron at one end. The other end of the dihedron is fitted with a set of two packing-blocks and two cylinders for positioning the optical fiber in the bisecting plane in a direction parallel to the edge of the dihedron. The fiber is finally fixed in position by means of a suitable adhesive.

7 Claims, 6 Drawing Figures

DEVICE FOR CENTERING AN OPTICAL FIBER WITHIN A TERMINAL, AND A TERMINAL CONSTRUCTED BY MEANS OF SAID DEVICE

The present invention relates to a portable equipment unit (tool) of simple and reliable design which can be employed on construction sites and makes it possible to mount terminals on optical fibers as a standard procedure and in such a manner as to ensure that any two terminals are aligned with an accuracy tolerance of the order of one micron in eccentric displacement. A terminal of this type is a precision component having a double function in a connector, namely the positioning of an optical fiber and the mechanical position-maintenance of the fiber within the single or multiple connector box.

This invention is also applicable to an optical-fiber transmission cable which contains a plurality of optical fibers, irrespective of the arrangement of the fibers in the cable.

There are many existing techniques for aligning two fibers in order to form a disconnectable connector.

These techniques call for very-high-precision parts, thus making it extremely difficult to obtain primary components and resulting in a very high cost price as well as presenting a real problem in regard to interchangeability.

Various systems such as positioning by three cylinders, by capillary tubes or by grooves also exist. While such technologies are applicable to connections of the type used in laboratories, problems inevitably arise from large-scale development and utilization on construction sites.

All these technologies are usually costly and do not offer every guarantee of reliability and especially of interchangeability of terminals. In fact, they make provision for systems in which the dimensional references for position location of the optical fiber relate to the terminal itself.

In other systems, recourse is had to the overmolding technique. There are fundamental differences, however, between systems of this type and the method described hereinafter. These differences lie in the fact that the overmolding operation is performed directly on the fiber itself, thus calling for the use of molds. The constant repetition of successive molding operations finally leads to degradation of the molds under the action of erosion which arises from the fact that the molding material is usually filled with glass fibers. Replacement of molds then presents an undeniable problem since interchangeability is an essential requirement and the different molds must be strictly identical.

The necessary accuracies in the positioning of optical fibers are of the order of one micron, thus entailing the need for high-precision machining operations which are incompatible with practical conditions of ordinary use and field assembly.

The present invention is not attended by any of these disadvantages. On the contrary, it provides much greater simplicity of design and construction, is easy to apply in practice and also entails a lower degree of accuracy of fabrication of the terminals in which the optical fibers are fixed.

According to the invention, accurate positioning of an optical fiber is effected with respect to a system of reference planes, the terminal in which the optical fiber is fixed being also related to said planes. In order to ensure enhanced accuracy of positioning of the terminal which is often of cylindrical shape, said terminal is provided with two flat faces inclined to each other at an angle equal to the angle made by the reference planes.

The invention therefore consists of a device for centering an optical fiber within a connector terminal, said device being distinguished by the fact that it comprises a reference dihedron cut from rigid material. One end of said reference dihedron is adapted to receive the terminal which is applied against the faces of the dihedron and the other end is adapted to receive a set of two packing-blocks and of two cylinders having the design function of positioning the optical fiber in the bisecting plane of the dihedron in a direction parallel to its edge.

Further distinctive features and advantages of the invention will become apparent from the following detailed description as well as from a study of the accompanying drawings, wherein.

Figure 1:
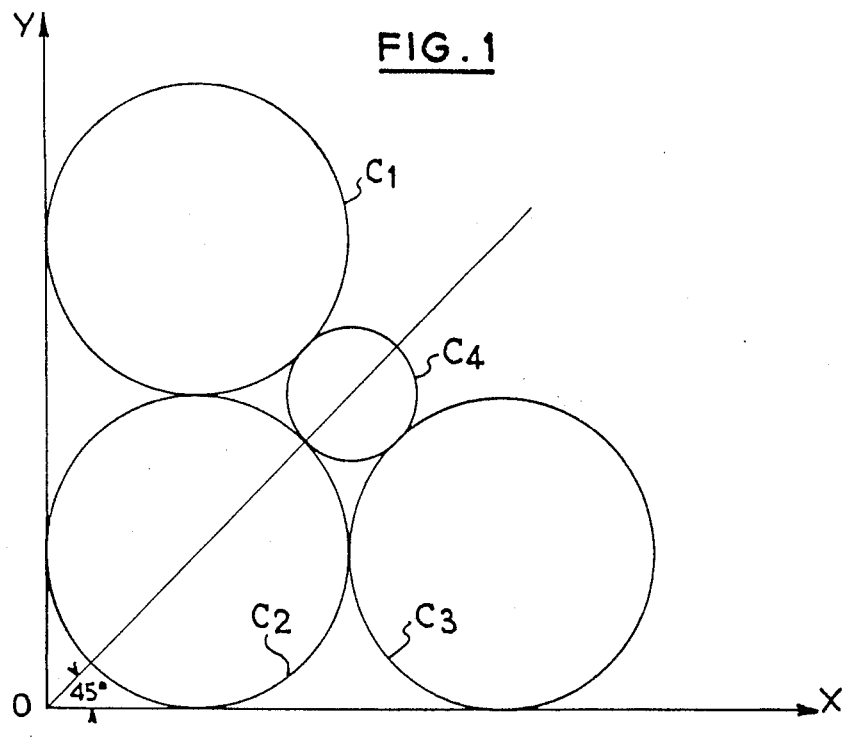
FIG. 1 is a geometrical diagram on which the device according to the invention is based.

FIG. 1 will serve to gain a clear understanding of the geometrical principles adopted as a basis for centering an optical fiber within its terminal.

In an orthonormal system xOy, consider three circles C1, C2 and C3 such that:
  C2 is tangent to the axes Ox and Oy
  C1 is tangent to the axis Oy and to C2
  C3 is tangent to the axis Ox and to C2
and also the condition that the circles C1, C2, C3 have the same diameter; the circle C4 which is tangent to the three circles aforesaid has its center located on the line bisecting the right angle xOy as a consequence of well-known geometrical laws.

If the system is extended to three dimensions, if the axes xOy are replaced by a right dihedron, if the circles C1, C2 and C3 are replaced by three cylinders having the same diameter, and if the circle C4 is replaced by an optical fiber, then said fiber is located in the bisecting plane of the dihedron and parallel to its axis of intersection.

The foregoing considerations relating to a system of rectangular axes or to a right dihedron remain valid if the angle is different from 90°.

In the case of an optical fiber having a diameter which is usually of the order of 125 microns, the cylinders have a diameter of 302 microns to within a few tenths of a micron. In more general terms, the ratio of the diameters of three circles C1, C2, C3 which are equal and tangent both to two perpendicular axes and to a circle C4, is equal to 2.421.

When applying this rule of geometry, the precise lever of the optical fiber with respect to the reference faces of the centering device and of the terminal is determined and obtained by means of two packing-blocks with a constant K equal to the diameters of C1, C2, C3. These packing-blocks are in relation to the diameter of the terminal.

The sole condition for ensuring that the terminals of different completed assemblies are interchangeable is that the two packing-blocks should have the same thickness in all centering devices.

Figure 2:
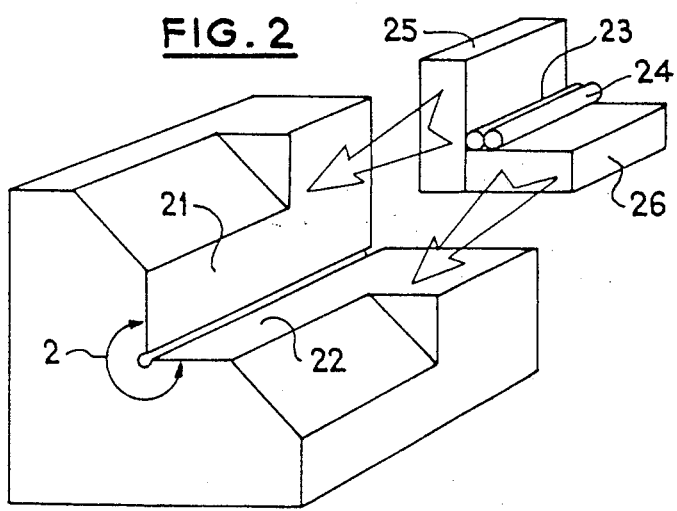
FIG. 2 illustrates the device according to the invention for centering optical fibers in their terminals.

FIG. 2 shows one possible form of construction of a device of this type and contemplated by the invention.

This device is machined from a block of rigid material such as steel, for example, and comprises a single dihedron 2 which is usually hollow and is preferentially a right dihedron (the accuracy obtained by machining is greater in the case of a right angle than in the case of any other angle), thus permitting of coincidence between the reference faces of the terminal and the reference faces 21 and 22 of the dihedron. The assembly for centering the optical fiber is constituted by two cylinders 23 and 24 having identical diameters and by two perpendicular packing-blocks 25 and 26 having identical thicknesses. It is apparent from FIG. 1 that the two cylinders 23 and 24 correspond to the circles C2 and C3 and form between them a housing in which the optical fiber is intended to rest. Since the two packing-blocks 25 and 26 have the same thickness and since there is a direct relationship between said thickness and the transverse dimensions of the terminal, the optical fiber is in fact located in the bisecting plane of the dihedron 2 when it is in position within its housing between the cylinders 23 and 24.

The centering assembly constituted by the two packing-blocks and the two cylinders as illustrated in FIG. 2 is shown in an exploded view in order to gain a better understanding of the general arrangement. This assembly is in fact fixed by any suitable means on the faces 21 and 22 of the dihedron as indicated schematically in the figure by two arrows. The respective dimensions are such that the dihedron 2 is capable of receiving a terminal and a centering assembly which are both positioned with respect to the same reference dihedron. The terminal and the optical fiber are thus perfectly aligned and located with respect to each other or concentric if the terminal has a circular cross-section.

An equipment unit such as the device herein described is fairly simple to produce since the only accuracy required relates to the inherent flatness of the faces of the dihedron 2, whereas the position and angle of the dihedron do not play any part in the accuracy of the connection. Moreover, the cylinders and the packing-blocks are metrology components which are machined to one-tenth of a micron and made commercially available by many different suppliers.

Figure 3:
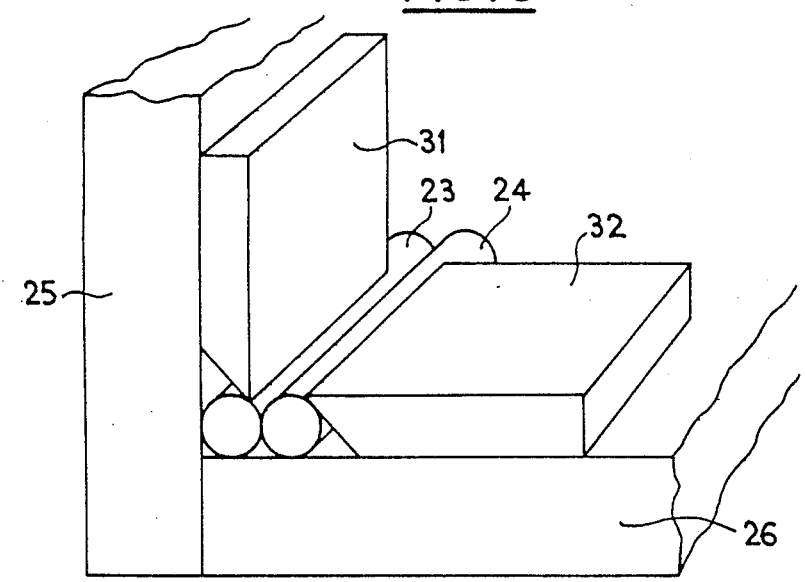
FIG. 3 illustrates one of the preferential position-setting systems for wedging the cylinders which serve as a housing for the fiber, in the device of FIG. 2.

FIG. 3 illustrates a detail of the device, namely one of the possible modes of attachment of the cylinders 23 and 24 against the packing-blocks 25 and 26. Since the requisite accuracy is of the order of one micron, bonding by means of adhesive cannot be contemplated since this would introduce a "parasitic" layer of adhesive having a thickness of several microns. Welding or brazing of cylinders is also ruled out since the cylinders have a diameter of the order of 300 microns and would be deformed as a result of welding. The cylinders are therefore maintained in the correct position against the packing-blocks 25 and 26 by means of two components 31 and 32 which are chamfered on one end face and apply a force against the cylinders. The position-setting components 31 and 32 can be welded, soldered or bonded by adhesive. Any possible deformation of said components would not be of any consequence since they do not have any direct function in the centering of the optical fiber. However, in view of the small dimensions of the assembly (from a few hundred microns in the case of the cylinders to 1 or 2 mm in thickness in the case of the packing-blocks), a preferable solution consists in tightly applying the assembly formed by these components against the dihedron 2 by means of two fastening clamps having sufficient dimensions to be screwed against the faces 21 and 22 of the dihedron.

Figure 4:
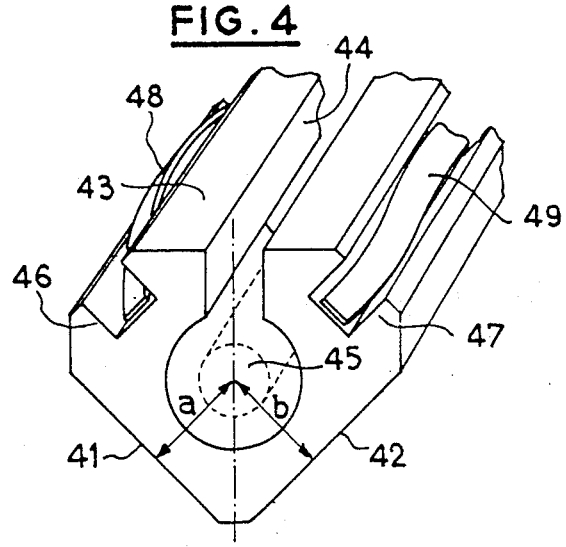
FIG. 4 is a transverse sectional view showing one possible form of construction of the terminal employed in conjunction with the centering device according to the invention.

FIG. 4 is a transverse sectional view showing the end of a terminal which is employed in conjunction with the centering device according to the invention. The other end of the terminal can be provided with different means for protection of the optical fiber or for attachment within a multiple connector, for example, such means being outside the field of interest of this invention.

The end portion of the terminal which comes within the purview of the invention is the portion which comes into contact with another terminal in order to establish an optical connection between two fibers. It is therefore in this end portion that the fiber has to be positioned with the greatest accuracy.

The terminal is fabricated from rigid material by machining, molding, die-stamping or any other suitable method. A distinctive feature of the terminal lies in the fact that two main flat faces 41 and 42 form a dihedron which is usually salient and is preferably a right dihedron but is in all cases identical with the dihedron 2 of the centering device. A third main flat face 43 has a groove 44 which is parallel to the edge of the dihedron described earlier, has a width which is greater than the diameter of the optical fiber and a depth which is greater than the theoretical distance from the fiber to said face 43. A preferred form of groove includes a widened portion in the region in which the fiber is located. Thus the fiber can be inserted in the groove without touching the terminal, accurate positioning of said fiber being consequently ensured.

In order to gain a better understanding of FIG. 4, the optical fiber 45 is shown in dashed lines in this figure. After accurate positioning of the fiber within the terminal by means of the device according to the invention, the fiber is fixed in position by means of an adhesive which is introduced into the groove 44. Said adhesive is preferentially polymerizable and hardenable at ordinary temperature and is filled with quartz powder or glass powder in order to facilitate subsequent polishing of the end portion of the terminal.

No determining role is played either by the number or shape of the other secondary faces of the terminal.

It is worthy of note that said terminal is symmetrical with respect to the bisecting plane of the dihedron formed by the planes 41 and 42. Accordingly, all terminals of exactly the same type as the terminal shown in the figure have a non-specialized coupling function. In consequence, and only on condition that the optical fiber is located at the same distance from each plane of the dihedron ($a=b$), any one terminal can be coupled with any other terminal without any distinction of direction or of side (left or right).

The terminal is further provided on two secondary faces with two grooves 46 and 47 which are distinguished by the fact that each groove is located on a face opposite to one face of the dihedron.

It can thus be mentioned by way of example and not in any limiting sense that the groove 46 is cut in a face opposite to the face 42 with respect to the center of the optical fiber and the groove 47 is cut in a face opposite to the face 41. Said grooves are fitted with resilient means such as leaf-springs 48 and 49. In the device according to the invention, the leaf-springs do not play any active part during centering of the fiber but are intended to produce action in a connector in which two terminals are grouped together, thus having the effect of ensuring that the optical fiber is centered by exerting a pressure which places the dihedron 41-42 in a correct position with respect to the connector box.

It has been considered necessary to give the foregoing explanatory details concerning the terminal in order to make it easier to understand how the optical fiber is positioned by means of the device according to the invention: the fiber and the terminal are both located with respect to a single dihedron, namely the dihedron 2 of FIG. 2.

The fabrication of a terminal entails the following different steps:

(a) assembly of the fiber housing, positional locking of the packing-blocks 25 and 26, of the cylinders 23 and 24 and of the fixing components 31 and 32.

(b) locking of the terminal by suitable means (which do not come within the scope of the invention) in a position in which the terminal dihedron is in coincident relation with the reference dihedron of the device.

(c) stripping of the plastic jacket from the optical fiber over a distance at least equal to the length of its housing increased by approximately one-half the length of a terminal.

(d) locking of the fiber within its housing after insertion of said fiber within the terminal; a component provided with a rubberized cushioning layer is well suited to locking of the fiber within its housing.

(e) overmolding of the fiber in its position with material having relatively high hardness in its stable state, such as adhesives which may or may not be filled with fine particles of quartz or glass and which are polymerizable; any other overmolding system such as cross-linking induced by ultraviolet radiation is suitable but neither the material employed nor the method are relevant to the present invention.

(f) sawing or breaking of the optical fiber flush with the terminal at the end corresponding to subsequent connection with another optical fiber, and polishing of this end portion of the terminal in accordance with a technique conventionally adopted for all optical connections.

Figure 5:
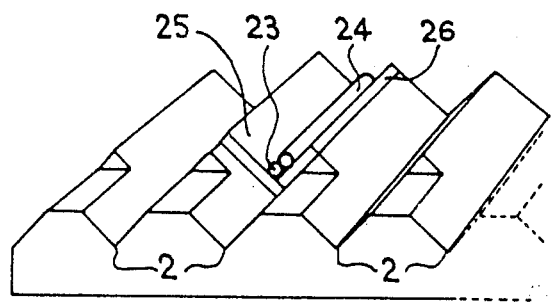
FIG. 5 shows the arrangement contemplated by the invention for the assembly of terminals in the case of bundles of optical fibers.

Reverting to the subject of the equipment unit employed, FIG. 5 shows the device according to the invention in the case in which the connector to be fabricated no longer has only one optical connection but is designed for the connection of two bundles of fibers.

Instead of a repetition of "n times for n" fibers when carrying out the overmolding of a terminal by means of the simple equipment shown in FIG. 2 since this would be liable to result in breakage of a fiber during the handling of the other fibers, the invention also makes provision for a multiple equipment unit which permits simultaneous positioning of a plurality of fibers within a plurality of terminals. FIG. 5 illustrates the four first dihedrons of a multiple equipment unit of this type. The calibrated cylinders 23 and 24 and the packing-blocks 25 and 26 are shown by way of illustration in the first dihedron.

Figure 6:
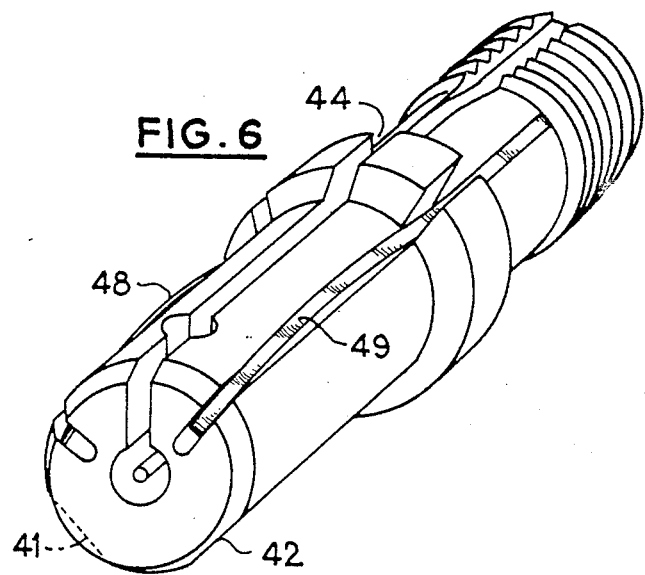
FIG. 6 illustrates a connector terminal obtained by means of the method described in accordance with the present invention.

FIG. 6 illustrates one type of single-fiber terminal which is constructed by making use of the means provided by the invention.

The optical fiber appears at the center of the connection face and is also shown partly covered with its protective jacket at the "line" end of the terminal. The reference dihedron is constituted by the two planes 41 and 42; resilient means such as leaf-springs 48 and 49 apply the terminal against another reference dihedron which is identical with the dihedron defined by the planes 41 and 42 but forms part of the connector box.

Means are provided for maintaining the terminal within the connector box and against another identical terminal with which it constitutes a connection: solely by way of explanation, these means are shown in the form of a screw thread.

What is claimed is:

1. A device for centering an optical fiber within a connector terminal comprising:
    a reference dihedron block having two faces, fabricated from a rigid material, one end thereof being adapted to receive the terminal;
    a centering assembly adapted to be received by the other end of the reference dihedron block, including
        two packing blocks of equal thickness, each such block being applied against a face of the reference dihedron block, and
        two cylinders, each having a diameter equal to 2.421 times the diameter of the optical fiber in the case of a right dihedron, the cylinders being tangent to each other and to at least one packing block, one of the cylinders being tangent to both packing blocks;
    the centering assembly operating to position the optical fiber in the plane bisecting the dihedral angle defined by the faces of the reference dihedron block in a direction parallel to the edge of the dihedron block.

2. A device for centering an optic fiber within a connector tip comprising:
    a dihedron block fabricated from a rigid material and having two reference faces cut therein;
    means for positioning the connector tip at one end of the dihedron block against the two reference faces thereof; and
    means for positioning the optic fiber at the other end of the dihedron block, said means for positioning including a set of two wedges of the same thickness and two cylinders, each cylinder abutting at least one of the wedges, said positioning means placing the optic fiber in the plane bisecting the dihedral angle formed by the two reference faces and parallel to the edges of the dihedron block.

3. A centering device according to claim 2 wherein the faces of the dihedron block define an acute dihedral angle.

4. A centering device according to claim 2 wherein the diameter of each cylinder is equal to 2.421 times diameter of the fiber, and wherein each wedge is supported against a face of the dihedron block, and the cylinders are tangent to each other, and each cylinder is tangent to a wedge, one of the cylinders being tangent to both wedges.

5. A centering device according to claim 2 wherein the precision of the arrangement of the cylinders and wedges determines the precision of centering of the optic fiber within the connector tip.

6. An optic fiber connection system for centering an optic fiber within a connector tip, comprising:
   a dihedron block fabricated from a rigid material and having two reference faces cut therein;
   means for positioning the connector tip at one end of the dihedron block against the two reference faces thereof; and
   means for positioning the optic fiber at the other end of the dihedron block, said positioning means including a set of two wedges of the same thickness and at least two cylinders, each abutting at least one of the wedges, said positioning means placing the optic fiber in the plane bisecting the dihedron formed by the two reference faces parallel to the edges of the dihedron, the configuration of the connector tip defining a longitudinal plane of symmetry which merges with the plane bisecting the dihedral angle of the dihedron block when the tip is positioned on the centering device.

7. A system according to claim 6 wherein the connector tip has a groove therein through which the optic fiber can be inserted into the tip, the groove having dimensions greater than the diameter of the fiber, the tip further having a bore, communicated with the groove, in which the fiber is positioned, the bore being adapted to receive a glue for immobilizing the fiber within the bore as positioned by the centering device.

* * * * *